United States Patent
Marum et al.

(10) Patent No.: US 9,003,494 B2
(45) Date of Patent: *Apr. 7, 2015

(54) AUTOMATIC AUTHORIZATION OF USERS AND CONFIGURATION OF SOFTWARE DEVELOPMENT ENVIRONMENT

(75) Inventors: Matthew G. Marum, Cary, NC (US); Samuel G. Padgett, Raleigh, NC (US); Steven K. Speicher, Holly Springs, NC (US); Michael J. Tabb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,512

(22) Filed: Jun. 27, 2012

(65) Prior Publication Data

US 2013/0347077 A1    Dec. 26, 2013

Related U.S. Application Data

(63) Continuation of application No. 13/533,181, filed on Jun. 26, 2012.

(51) Int. Cl.
*G06F 7/04* (2006.01)
*H04L 29/06* (2006.01)
*G06F 21/62* (2013.01)
*G06F 21/31* (2013.01)
*G06Q 10/06* (2012.01)

(52) U.S. Cl.
CPC ............ *H04L 63/08* (2013.01); *G06F 21/6218* (2013.01); *G06F 21/31* (2013.01); *G06Q 10/063118* (2013.01)

(58) Field of Classification Search
None
See application file for complete search history.

(56) References Cited

U.S. PATENT DOCUMENTS

| | | | | |
|---|---|---|---|---|
| 5,978,476 A | * | 11/1999 | Redman et al. | 705/51 |
| 6,470,339 B1 | | 10/2002 | Karp et al. | |
| 6,591,278 B1 | * | 7/2003 | Ernst | 1/1 |
| 7,212,987 B2 | * | 5/2007 | Swanke et | 705/7.15 |
| 8,375,429 B2 | * | 2/2013 | Mondal | 726/8 |
| 2002/0055832 A1 | * | 5/2002 | Donelan et al. | 703/22 |
| 2004/0103046 A1 | * | 5/2004 | Christoph et al. | 705/28 |

(Continued)

FOREIGN PATENT DOCUMENTS

WO    2004102431 A1    11/2004

OTHER PUBLICATIONS

"Resource Manager Role Guide for Project Web Access," [online] Microsoft Office Project Server 2007, Microsoft Corporation © 2012, [retrieved Jun. 13, 2012] retrieved from the Internet: <http://office.microsoft.com/en-us/project-server-help/resource-manager-role-guide-for-project-web-access-HA010250975.aspx>, 7 pgs.

"Technical Features," [online] Artios System Solutions, [retrieved Jun. 13, 2012] retrieved from the Internet: <http://www.artios.co.za/index_files/Page3167.htm>, 5 pgs.

(Continued)

*Primary Examiner* — Aravind Moorthy
*Assistant Examiner* — Jason Plotkin
(74) *Attorney, Agent, or Firm* — Cuenot, Forsythe & Kim, LLC

(57) ABSTRACT

Automatic authorization of users and configuration of a software development environment can include selecting a task defined within a project plan of a software system under development, wherein the task specifies a development tool and a user, and automatically authorizing, using a centralized data processing system, the user to access the development tool.

13 Claims, 3 Drawing Sheets

(56) References Cited

U.S. PATENT DOCUMENTS

2006/0242611 A1* 10/2006 Drake ............................. 716/1
2009/0099895 A1   4/2009 Carrier et al.
2011/0219433 A1* 9/2011 Albrecht-Buehler ............ 726/4
2012/0151486 A1   6/2012 Owen et al.

OTHER PUBLICATIONS

"TeamFrame: Features Overview," [online] Crux Cybernetics Pty Ltd. © 2010, [retrieved Jun. 26, 2012] retrieved from the Internet: <https://www.teamframe.net/web/teamframe.jsp?page=Features>, 1 pg.

* cited by examiner

AUTOMATIC AUTHORIZATION OF USERS AND CONFIGURATION OF SOFTWARE DEVELOPMENT ENVIRONMENT

CROSS-REFERENCE TO RELATED APPLICATIONS

This application is a Continuation of U.S. application Ser. No. 13/533,181, filed on Jun. 26, 2012, the entirety of which is incorporated herein by reference.

BACKGROUND

Modern software systems are exceedingly complex. Development of a software system incorporates activities such as project planning, resource planning, release management, build management, stream management, and the like. Further adding to this complexity, the teams involved in any given software development project are routinely located in geographically different locations. Managing this complexity requires a comprehensive view of the availability and skills of the resources involved.

BRIEF SUMMARY

One or more embodiments disclosed within this specification relate to software development.

An embodiment can include a method. The method can include selecting a task defined within a project plan of a software system under development, wherein the task specifies a development tool and a user, and automatically authorizing, using a centralized data processing system, the user to access the development tool.

Another embodiment can include a system. The system can include a processor configured to initiate executable operations. The executable operations can include selecting a task defined within a project plan of a software system under development, wherein the task specifies a development tool and a user, and automatically authorizing the user to access the development tool.

Another embodiment can include a computer program product. The computer program product can include a computer readable storage medium having stored thereon program code that, when executed, configures a processor to perform executable operations. The executable operations can include selecting a task defined within a project plan of a software system under development, wherein the task specifies a development tool and a user, and automatically authorizing the user to access the development tool.

DETAILED DESCRIPTION

Figure 1:
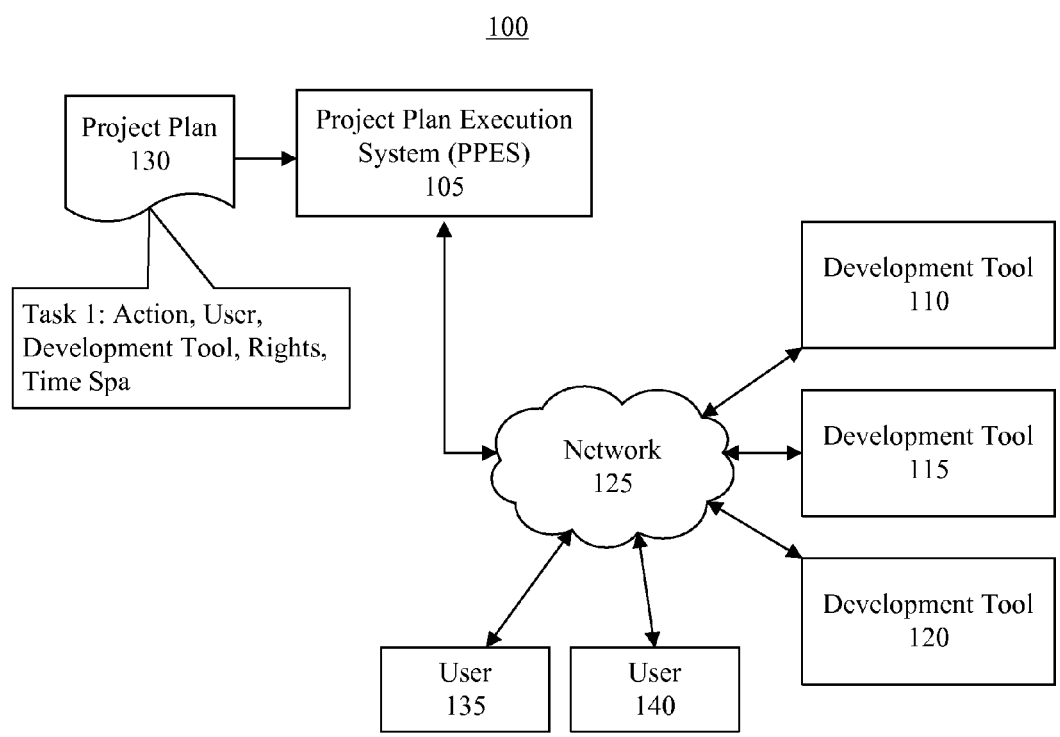
FIG. 1 is a block diagram illustrating a software development environment 100 in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to software development. In accordance with the inventive arrangements disclosed within this specification, a project plan is developed that specifies one or more tasks relating to the development of a particular software system. The tasks can specify particular information such as what is to be done, who is to perform the task, when the task is to be performed, and the particular development tool or tools to be used in completing the task.

A project plan execution system can access the project plan and determine the particular users that require access to development tools to perform the tasks. As used within this specification, the term "user" refers to a human being. The project plan execution system can provide users with access to the development tools necessary for each respective user to complete the task(s) assigned to the user as needed. The project plan execution system provides users with access to the development tools in an automated manner thereby reducing the burden of manually configuring the development tools. Similarly, the project plan execution system ensures that a user's ability to access a development tool responsive to completion of a task or another predetermined condition being met is discontinued.

FIG. 1 is a block diagram illustrating a software development environment 100 in accordance with an embodiment disclosed within this specification. Within this specification, the term "development" is used to refer to activities including "software development," "software maintenance," "application lifecycle management," or the like. As such, the term "development" encompasses any tasks involved in, or part of, creating (developing) a software system, maintaining a software system, and/or application lifecycle management.

As pictured, software development environment 100 can include a project plan execution system (PPES) 105 coupled to one or more development tools 110, 115, and 120 via a network 125. For purposes of illustration, each of the PPES 105 and development tools 110-120 can represent a data processing system that is operable to execute program code. As such, each of PPES 105 and development tools 110-120 can execute an operating system and an application that, taken together, configure each of the aforementioned blocks to perform the executable operations described within this specification. In one aspect, PPES 105 is a centralized data processing system such as a server.

It should be appreciated that PPES 105 and each of development tools 110-120 can represent a single data processing system or a collection of two or more data processing systems. For example, each development tool can be embodied as one data processing system or a collection of two or more interconnected data processing systems. In another example, however, two or more development tools can be embodied as a single data processing system.

Network 125 can represent any of a variety of communication networks or a combination of two or more communication networks coupled together. For example, network 125 can be implemented as, or include, a Wide Area Network, a local area network, a wireless network, a mobile network, the Internet, or various combinations thereof, to which data processing systems, communication devices (including mobile devices), and the like can be coupled.

Development tools 110-120 represent any of a variety of different development tools found within a software development environment. Examples of different varieties of development tools can include, but are not limited to, a project planning system, a resource planning system, a source code control system, a build and release system, a distribution system, or the like. In general, each of development tools 110-120 represents a particular development tool to which one or more users must be granted access from time to time in order to complete tasks delegated to that user as part of a project plan such as project plan 130.

As pictured, project plan 130 can be provided to PPES 105. A "project plan" refers to a collection of one or more tasks that must be performed to complete a specific software development project relating to the development of a software system. Examples of tasks can include development of source code for the software system, correcting defects in the software system, generating builds of the software system, stream (e.g., version) management and/or integration for the software system, test execution, build execution, image distribution, etc.

FIG. 1 illustrates an example of a task, referred to as "Task 1," that can be included within project plan 130. As shown, Task 1 specifies an action that is to be performed (e.g., the "what" that is to be performed), a user (e.g., a developer) assigned to the task, a development tool to be utilized by the user in performing the task, one or more rights to be granted to the user within the development tool, and a time span during which the user is to perform the task and, therefore, have access to the development tool associated with the task. The user, for example, is to be granted the rights specified within the task in the development tool in order to complete the task (or action specified by the task). Other parameters that can be included or specified as part of a task within project plan 130 can include a role for the user to be assumed in performing the task.

In one example, a supervisor or project planner can create project plan 130 using available planning tools. Responsive to releasing project plan 130 to PPES 105, PPES 105 can execute project plan 130 by identifying unfinished tasks, determining which developers are to have access to particular development tools for tasks, automatically establishing access for the developers with the development tools, configuring the development tools to provide users with the rights specified within the tasks, monitoring for task completion, and automatically discontinuing access for the developers upon expiration of the time span during which the developer is to have access to the development tool or responsive to completion of the task with which the developer is associated.

Consider the case in which task 1 specifies a particular action that requires usage of development tool 110 by user 135. For purposes of illustration, it can be assumed that each user, e.g., user 135 and/or user 140, interacts with software development environment 100 by way of a data processing system, e.g., a client. Accordingly, reference to a user also refers to the particular data processing system through which the user interacts with one or more other components of software development environment 100.

In any case, PPES 105 can ensure that user 135 has access to development system 110 for the time span specified in task 1. For example, PPES 105 can configure development tool 110 to provide the rights specified by task 1 to user 135 for the time span specified by task 1. Similarly, project plan 130 can include another task, e.g., task 2 (not shown), that indicates that user 140 is to be provided access to development system 110 for a different time span that may overlap with the time span of task 1 or that is completely disjoint from the time span of task 1. In either case, PPES 105 can ensure that user 140 is provided with the appropriate rights within development system 110 for the time span as specified by task 2.

The example above is provided for purposes of illustration. It should be appreciated that PPES 105 can interact with one or more or all of development tools 110-120 in order to configure each respective system with access rights for one or more users involved in performing tasks in project plan 130. Further, PPES 105 can continue to operate over the lifetime of the software development project corresponding to project plan 130 to continue facilitating access to development tools for users and removing that access when necessary as described within this specification.

Figure 2:
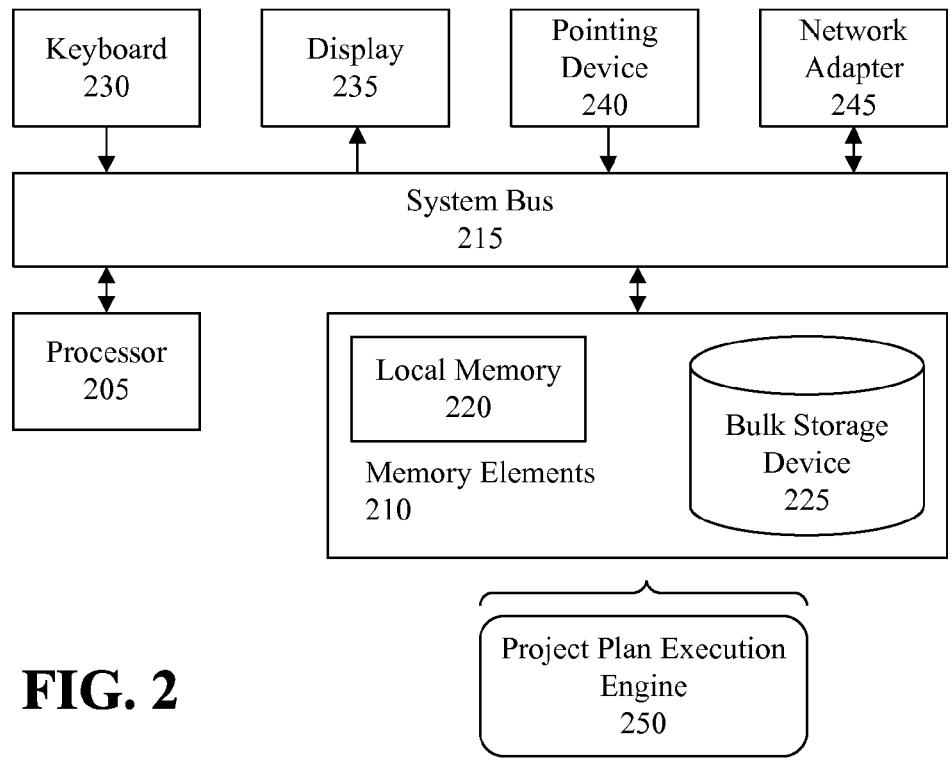
FIG. 2 is a block diagram illustrating an exemplary implementation of the project plan execution system (PPES) 105 of FIG. 1 in accordance with another embodiment disclosed within this specification.

FIG. 2 is a block diagram illustrating an exemplary implementation of the PPES 105 of FIG. 1 in accordance with another embodiment disclosed within this specification. Like numbers will be used to refer to the same items throughout this specification.

PPES 105 can be include at least one processor 205 coupled to memory elements 210 through a system bus 215 or other suitable circuitry. As such, PPES 105 can store program code within memory elements 210. Processor 205 can execute the program code accessed from memory elements 210 via system bus 215. In one aspect, for example, PPES 105 can be implemented as a computer that is suitable for storing and/or executing program code. It should be appreciated, however, that PPES 105 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. PPES 105 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to PPES 105. The I/O devices can be coupled to PPES 105 either directly or through intervening I/O controllers. One or more network adapters 245 also can be coupled to PPES 105 to enable PPES 105 to become coupled to other systems, computer systems, remote printers, and/or remote storage devices through intervening private or public networks. Modems, cable modems, and Ethernet cards are examples of different types of network adapters 245 that can be used with PPES 105.

As pictured in FIG. 2, memory elements 210 can store a project plan execution engine 250. Project plan execution engine 250, being implemented in the form of executable program code, can be executed by PPES 105 and, as such, can be considered part of PPES 105. Accordingly, project plan execution engine 250, when executed, configures PPES 105 to perform the various functions and executable operations described within this specification.

Figure 3:
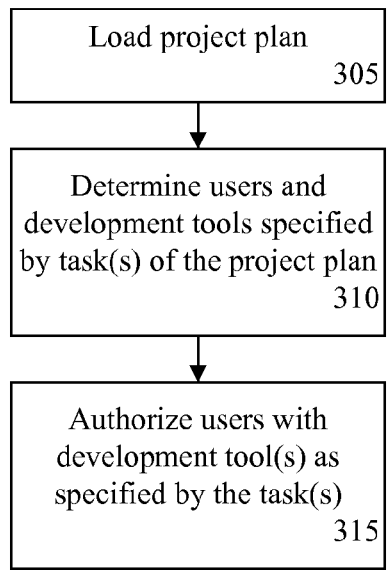
FIG. 3 is a flow chart illustrating a method of project planning in accordance with another embodiment disclosed within this specification.

FIG. 3 is a flow chart illustrating a method 300 of project planning in accordance with another embodiment disclosed within this specification. Method 300 can be implemented using the PPES 105 as described with reference to FIGS. 1 and 2 (hereafter "system").

Method 300 can begin in block 305 where a project plan can be loaded into the system. In block 310, the system can determine users and development tools that are specified by one or more tasks included within the project plan. In block 315, the system can authorize each user specified by a task with the particular development tool, or development tools as the case may be, also specified by the task.

Authorization for a user with a particular development tool can be performed in a variety of different ways. In one aspect, the system can access an interface of a development tool to interact with the development tool directly. In that case, the system can effectively log into the development tool and access an account of the user to which access is to be provided. The system can configure the development tool to provide the user with the necessary access to the development tool in the form of one or more rights according to the task.

In another aspect, the system can generate temporary tokens that, when in possession of a user (e.g., the data processing system of the user), provide the user with access to one or more development tools. Accordingly, a "token based" development tool refers to a development tool that permits access to the development tool according to whether the data processing system of a user includes or has stored a token.

In one embodiment, the token is a bearer token that acts as a credential for purposes of authenticating the user to the development tool or development tools. A bearer token refers to a digital object that is presented to an entity, e.g., a verifying entity such as a development tool, in an authentication transaction. In the case of a bearer token, the bearer token need not be bound to a particular identity. Rather, the mere possession of the bearer token by a data processing system authorizes the user (the data processing system of the user) for particular activities. In another embodiment, the token is not a bearer token and, as such, requires authentication or verification by the system.

Figure 4:
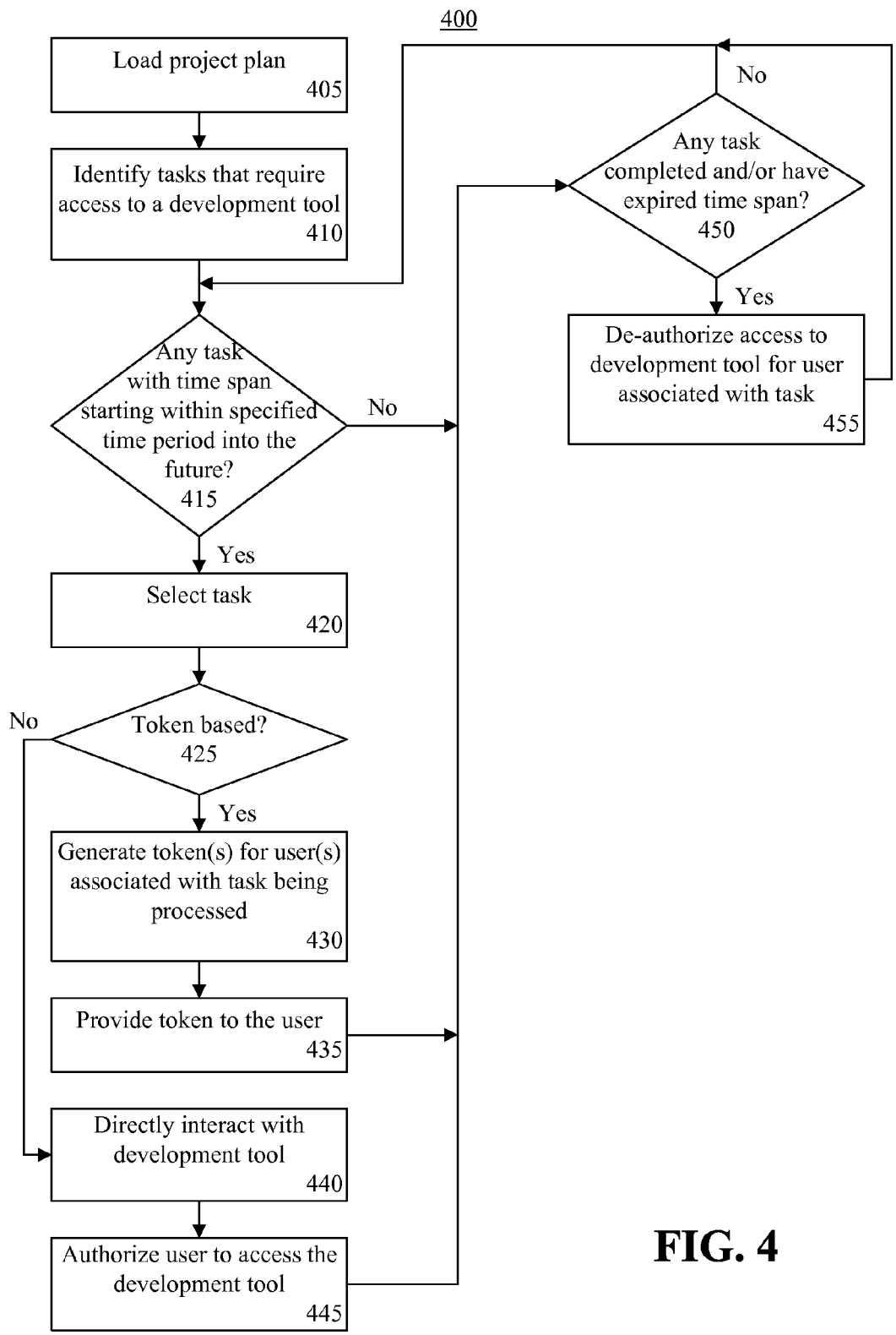
FIG. 4 is a flow chart illustrating a method of project planning in accordance with another embodiment disclosed within this specification.

FIG. 4 is a flow chart illustrating a method 400 of project planning in accordance with another embodiment disclosed within this specification. Method 400 can be implemented using the PPES (system) 105 as described with reference to FIGS. 1-3 of this specification.

In block 405, the system can load the project plan. Once loaded, the system can begin execution of the project plan. For example, the system can continually monitor the current date and/or time and to identify tasks that require processing. In block 410, the system can identify tasks from the project plan that require access to a development tool. For example, the system can identify any task that specifies that a user is to be provided with access to a development tool.

In block 415, the system can determine, or identify, whether any tasks exist within the project plan that specify a time span that begins within a predetermined amount of time into the future. It should be appreciated that block 415 need only operate upon, or search, those tasks identified in block 410. In illustration, the system can be configured to detect tasks indicating that a user is to be provided access to a development tool for a time span that has a start time that occurs within the next five minutes, within the next hour, within the next 24 hours, or the like. In one aspect, the predetermined amount of time into the future used to detect the start time of a time span for a task can be configurable as a system parameter and/or can be specified on a per task basis.

If the system identifies one or more tasks, method 400 can continue to block 420. If not, method 400 can continue to block 450. Continuing with block 420, the system can select a task identified in block 415. In block 425, the system can determine whether the development tool is a token based. If so, method 400 can proceed to block 430. If not, method 400 can continue to block 440.

In block 430, the system can generate one or more token(s) for user(s) associated with the particular task that is being processed. In one aspect, the system can generate a token for a token based system that specifies an expiration date and/or time that is set according to the time span of the task. Thus, the token can expire when the time span expires or completes. The system further can generate a token that specifies the particular rights that are to be afforded to a user when the user logs into the development environment using the token. Thus, in an embodiment in which a token is generated, the system need not login to the development tool to configure rights for the user. The time span for which the user is granted access to a particular development tool and the rights afforded to that user are specified through the token that is generated by the system.

In one embodiment, the information specified by the token is encoded within the token itself. In another embodiment, the information specified by a token is not stored within the token itself. Rather, the token is correlated with the task for which the token was generated and need not specify information directly. In that case, when a development tool is provided with a token from a user, the development tool can access the system to determine the particular rights associated with the token and the time span for which the token is valid, e.g., whether the token is expired. In any case, a control layer, or some other integration path, between the development tools and the system can be established over which the development tools can validate a received token.

It should be appreciated that the example provided is for purposes of illustration only and is not intended as a limitation of the one or more embodiments disclosed within this specification. In another embodiment, the token can be encoded with partial information with any additional information being obtained from the system using a correlation maintained between the token and the task for which the token was created as described.

In block 435, the system can provide the token to the user. The token can be provided through any of a variety of different methods such as via electronic mail, via a download or other manner of file access, or the like. After block 435, method 400 can proceed to block 450.

In block 440, in the case where the development tool is not token based, the system can directly interact with the development tool to authorize the user to access the development tool. In one aspect, the system can be provided with a level of access, e.g., administrative access, to one or more development tools via an exposed interface of the development tool(s). The system can interact directly with each respective development tool through the exposed interface of that development tool. The system, in effect, logs into the development tool as an administrative user with rights to change access rights of other users (human developers).

In block 445, the system can authorize the user to access the development tool. The system can configure the development tool to provide the user with the access, e.g., the one or more rights, as enumerated by the task. For example, the system can set or enable the rights, per the task, for an account of the user that is associated with the task within the development tool. In cases where the development tool permits the system to specify a time span for which the rights are valid, the system can do so. Otherwise, the system can monitor the status of the task as described within this specification and de-authorize the user as appropriate. After block 445, method 400 can proceed to block 450.

In block 450, the system can determine whether the time span for any task has expired. The time span for a task expires when the end time of the time span specified within the task has passed (e.g., is in the past). The system further can determine whether any of the tasks for which the time span has not expired have been completed. If so, method 400 can continue to block 455. If not, method 400 can proceed to block 415 to continue processing.

In block 455, the system can de-authorize access to a development tool for a user as specified by the particular task or tasks identified in block 450. In one aspect, the particular development tools for which users are de-authorized are those that are not of the token based variety. As such, the system logs into the development tools and removes or disables the rights previously provided for the user account within the development tools.

In another aspect, in the case of a token based development tool that contacts the system for authentication of a token, the system can de-authorize access for a given user from a task or tasks identified in block 450 by not authenticating the token to the development tool. Otherwise, e.g., as in the case of a bearer token, when the token expires, the bearer of that token loses access to the particular development tool for which the token was generated and/or issued without any further involvement by the system.

The one or more embodiments disclosed within this specification provide techniques for leveraging project and resource planning to automatically implement development tool access modifications so that projects can continue to run smoothly. The one or more embodiments disclosed within this specification are provided for purposes of illustration and are not intended as limitations. Other variations are also contemplated. For example, the project plan can be updated through the addition of new tasks, deleted tasks, or modified tasks. The system can execute the plan as it continues to evolve for a given software development project.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
    a processor configured to initiate executable operations comprising:
    selecting a task defined within a project plan of software system under development, wherein the task specifies a development tool and a user; and
    automatically authorizing the user to access the development tool, wherein automatically authorizing the user comprises:
    a centralized processing system directly accessing the development tool;
    the centralized processing system logging into the development tool with administrative rights; and
    configuring the development tool to provide the user with access to the development tool.

2. The system of claim 1, wherein the processor is further configured to initiate executable operations comprising:
    responsive to completion of the task, de-authorizing the user with the development tool.

3. The system of claim 1, wherein the task specifies a time span and the user is authorized to use the development tool only for the time span.

4. The system of claim 1, wherein the task specifies each right the user is to have when accessing the development tool, wherein automatically authorizing the user to access the development tool comprises enabling each right within an account of the user within the development tool.

5. A system embodied on a computer readable medium comprising:
    a computer readable storage medium having stored thereon program code that, when executed, configures a processor to perform executable operations comprising:
    selecting a task defined within a project plan of software system under development, wherein the task specifies a development tool and a user; and
    automatically authorizing the user to access the development tool, wherein automatically authorizing the user comprises:
    a centralized processing system directly accessing the development tool;
    the centralized processing system logging into the development tool with administrative rights; and
    configuring the development tool to provide the user with access to the development tool.

6. The computer program product of claim 5, wherein
    the computer readable storage medium further stores program code that, when executed, configures the processor to perform executable operations comprising:
    responsive to completion of the task, de-authorizing the user with the development tool.

7. The computer program product of claim 5, wherein
    the task specifies a time span and the user is authorized to use the development tool only for the time span.

8. The computer program product of claim 5, wherein
    the task specifies each right the user is to have when accessing the development tool, wherein automatically authorizing the user to access the development tool comprises enabling each right within an account of the user within the development tool.

9. A system, comprising:
at least one processor, wherein the at least one processor is configured to initiate and/or perform:
  selecting a task defined within a project plan of a software system under development, the task specifying a development tool and a user; and
  directly accessing, with a centralized data processing system separate from the user, the development tool to configure the development tool to automatically authorize the user to access the development tool.

10. The system of claim 9, wherein the at least one processor is further configured to initiate and/or perform:
directly accessing the development tool, responsive to completion of the task and by the centralized processing system, to de-authorize the user with the development tool.

11. The system of claim 9, wherein
the task specifies a time span and the user is authorized to use the development tool only for the time span.

12. The system of claim 9, wherein
the centralized processing system directly accesses the development tool by logging into the development tool with administrative rights.

13. The system of claim 9, wherein
the task specifies each right the user is to have when accessing the development tool, and
the user is automatically authorized to access the development tool by enabling each right within an account of the user within the development tool.

* * * * *